(12) United States Patent
Hall et al.

(10) Patent No.: US 9,878,819 B2
(45) Date of Patent: Jan. 30, 2018

(54) REUSABLE CONTAINER WITH INTERLOCKING MEMBERS AND METHOD OF USING SAME

(75) Inventors: Russell G. Hall, Sylvania, OH (US); Joseph J. Graber, Grabill, IN (US)

(73) Assignee: PACKAGING ENGINEERING, LLC, Toledo, OH (US)

( * ) Notice: Subject to any disclaimer, the term of this patent is extended or adjusted under 35 U.S.C. 154(b) by 1281 days.

(21) Appl. No.: 12/968,398

(22) Filed: Dec. 15, 2010

(65) Prior Publication Data
US 2011/0155726 A1    Jun. 30, 2011

Related U.S. Application Data

(60) Provisional application No. 61/290,260, filed on Dec. 28, 2009.

(51) Int. Cl.
*B65D 19/16* (2006.01)

(52) U.S. Cl.
CPC .... *B65D 19/16* (2013.01); *B65D 2519/00029* (2013.01); *B65D 2519/00064* (2013.01); *B65D 2519/00099* (2013.01); *B65D 2519/00169* (2013.01); *B65D 2519/00203* (2013.01); *B65D 2519/00238* (2013.01); *B65D 2519/00273* (2013.01); *B65D 2519/00293* (2013.01); *B65D 2519/00323* (2013.01); *B65D 2519/00333* (2013.01); *B65D 2519/00373* (2013.01); *B65D 2519/00502* (2013.01); *B65D 2519/00572* (2013.01); *B65D 2519/00582* (2013.01); *B65D 2519/00641* (2013.01); *B65D 2519/00676* (2013.01); *B65D 2519/00711* (2013.01); *B65D 2519/00815* (2013.01); *Y02W 30/807* (2015.05); *Y10T 29/49826* (2015.01)

(58) Field of Classification Search
USPC .............. 206/600; 217/43 R; 220/4.28, 4.31
See application file for complete search history.

(56) References Cited

U.S. PATENT DOCUMENTS

| 2,686,646 | A | * | 8/1954 | McMillan | 108/55.1 |
| 2,738,058 | A | * | 3/1956 | Hansen et al. | 206/597 |
| 3,809,234 | A | * | 5/1974 | Kurick | 206/448 |

(Continued)

FOREIGN PATENT DOCUMENTS

| DE | 2653999 A1 | 6/1978 |
| DE | 9108521 U1 | 9/1991 |

(Continued)

*Primary Examiner* — Fenn C Mathew
(74) *Attorney, Agent, or Firm* — James D. Miller; Shumaker, Loop & Kendrick, LLP

(57) ABSTRACT

A reusable container and a method of using same to transport fragile, yet heavy loads, is provided. The reusable container, preferably made primarily from wood, includes a base member, at least one vertical member having one or more vertical support members capable of being received in one or more interlock pockets in the base member, a top or lid and a cargo support member. These components interact in such a way as to provide for ease of assembly and disassembly by a single person, and to provide a container having great strength when assembled. More specifically, the at least one vertical member interlocks with the base member and adjacent vertical members, thus minimizing the need for supplemental fasteners.

21 Claims, 21 Drawing Sheets

(56) References Cited

U.S. PATENT DOCUMENTS

| | | | | |
|---|---|---|---|---|
| 5,622,306 A * | 4/1997 | Grigsby, Sr. | ............. | 229/122.27 |
| 5,669,507 A * | 9/1997 | Pruitt, Jr. | ...................... | 206/600 |
| 6,076,690 A * | 6/2000 | Hemmerly | .................. | 217/43 R |
| 6,216,899 B1 * | 4/2001 | Vicari | ............................ | 220/1.5 |
| 6,290,064 B1 * | 9/2001 | Kuhn et al. | ................... | 206/600 |
| 6,648,159 B2 * | 11/2003 | Prutkin et al. | ............... | 220/4.28 |
| 2004/0206660 A1 * | 10/2004 | Ko | ............................... | 206/600 |
| 2008/0283583 A1 * | 11/2008 | Hall | ........................ | 229/125.38 |

FOREIGN PATENT DOCUMENTS

| | | | | |
|---|---|---|---|---|
| FR | 1416251 A | 10/1965 | | |
| FR | 2789342 A1 * | 8/2000 | ............. | B27M 3/34 |

\* cited by examiner

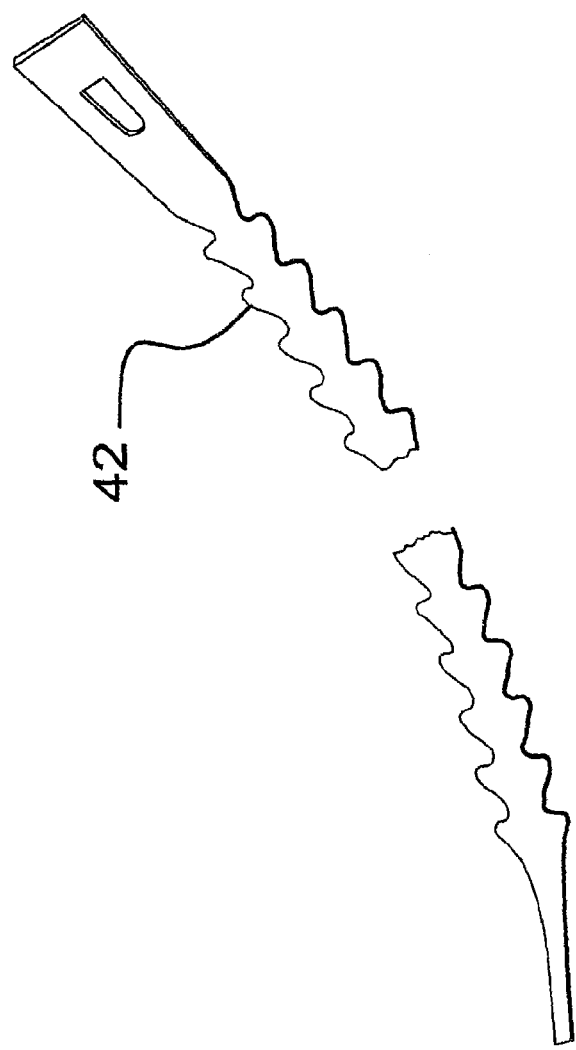

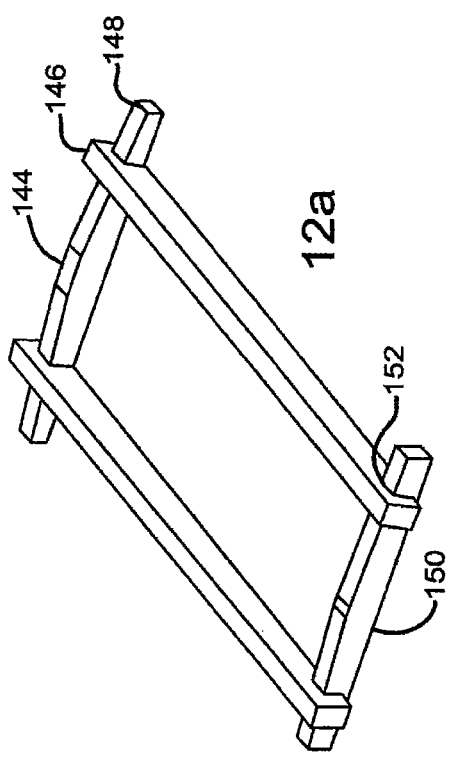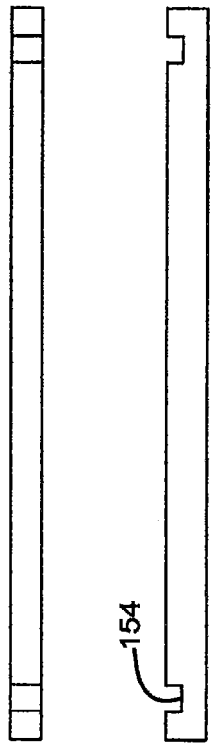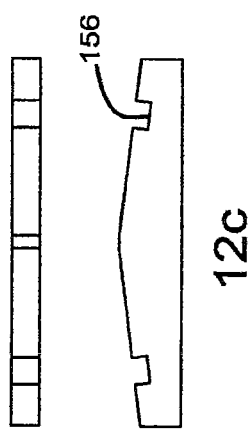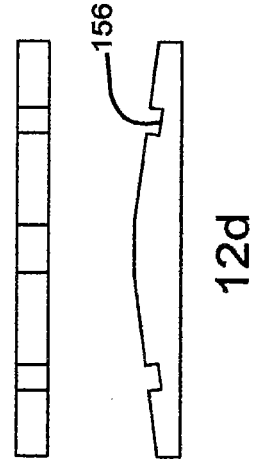
Fig. 12a-d

REUSABLE CONTAINER WITH INTERLOCKING MEMBERS AND METHOD OF USING SAME

RELATED APPLICATIONS

This application is claiming the benefit, under 35 U.S.C. 119(e), of the provisional application filed Dec. 28, 2009 under 35 U.S.C. 111(b), which was granted Ser. No. 61/290,260. This provisional application is hereby incorporated by reference.

BACKGROUND

The invention relates to a reusable container capable of transporting fragile, yet heavy loads. More specifically, the invention relates to a rugged container which can be re-used multiple times and is readily assembled and disassembled for use and for return transport. A method of using such a container is also provided.

Those engaged in transporting fragile but heavy cargoes will appreciate the dilemma of creating a container which is able to withstand the considerable stresses applied to a container during multiple uses for transporting, for example, glass sheets, while at the same time being light enough to be easily handled, and readily disassembled, preferably by one person, and importantly, being cost effective, compared to other types of packaging/containers. The present invention satisfies these often conflicting objectives.

SUMMARY OF THE INVENTION

The present invention relates to a reusable container which is capable of transporting fragile, yet heavy loads, for example a plurality of glass sheets or panels.

The container includes a base member, at least one vertical member having one or more vertical support members and being disposed in a receiving pocket in the base member, a top or lid disposed on or in the upper end of the at least one vertical member, and a cargo support member.

The aforesaid members interact in such a way as to aid ease of assembly of the container and to provide great strength to the container when assembled. More specifically, the at least one vertical member interlocks with one or more of the base member and adjacent vertical members, if any. Through such interlocking, the need for additional fasteners to assemble the container is minimized.

A method of using the container of the invention is also be provided. Although other materials may also be suitable, the container of the invention is preferably made from wood.

BRIEF DESCRIPTION OF THE DRAWINGS

Additional objects, advantages and features of the present invention will become apparent from the following description and appended claims taken in conjunction with the accompanying drawings in which:

FIG. 5a is a plan view of the rear vertical member of FIG. 5 according to the invention.

FIG. 11 is a perspective view of a locking strap that is suitable for use with the invention.

FIG. 12a is a perspective view of an alternative cargo support member according to the invention.

FIG. 12b-d show a variety of views of the components of the alternative cargo support member.

DETAILED DESCRIPTION OF THE INVENTION

The present invention relates to a reusable container capable of transporting fragile materials, such as automobile windshields formed of glass, that are fragile but also quite heavy, requiring a very protective and robust container. A desirable container for this purpose should also be stable during loading, be easy to assemble, be collapsible for return shipping and maintain its integrity over many uses. The container of the present invention meets these, as well as other objectives.

The container of the invention utilizes a number of simple, but effective means to interlock various component members of the container, thus creating a stable, high strength structure even before the container is completely assembled. The positive interlock features also facilitates assembly, as it is clear to the assembler when the component members are properly in place.

Figure 7:
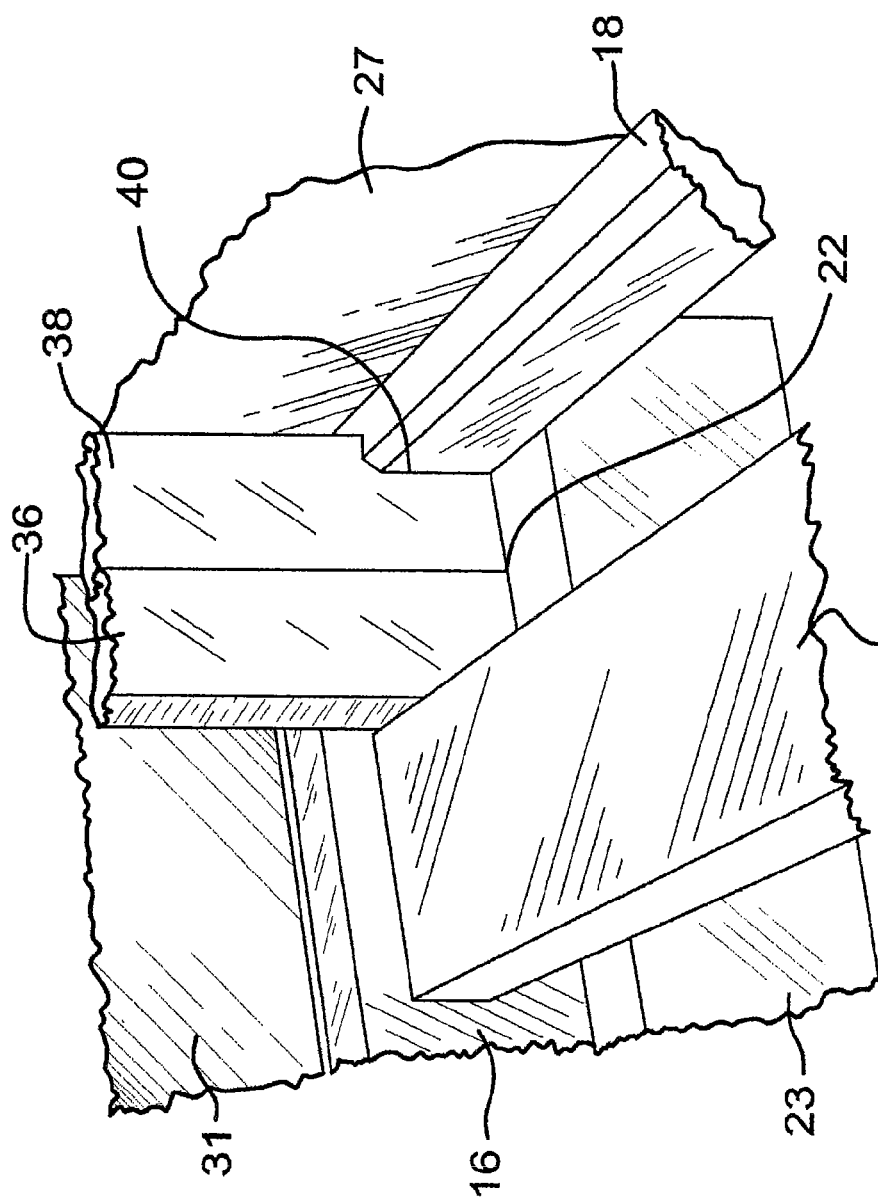
FIG. 7 is a detail of FIG. 1 showing the interlocking means of the rear vertical member and a side vertical member with the base member according to the invention.
Figure 8:
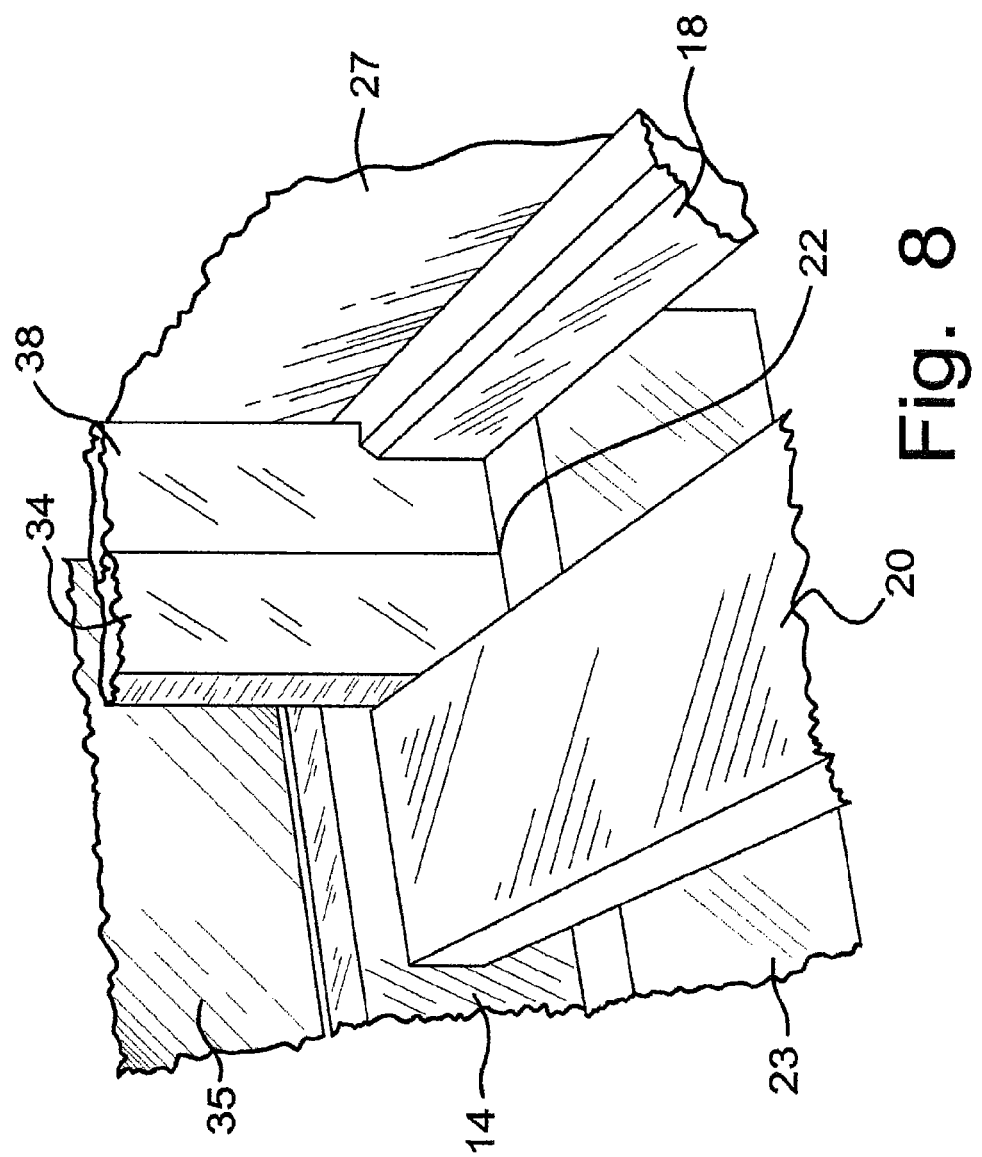
FIG. 8 is a detail of FIG. 1 showing the interlocking means of the front vertical member and a side vertical member with the base member according to the invention.

While described in greater detail below, for example with regard to FIGS. 7 and 8, the interlocking features of interest include vertical side member supports 38 having a locking notch 40. When vertical side member support 38 is placed in vertical member support interlock pocket 22, locking notch 40 allows the vertical side member support 38 to engage side locking rail 18. Inserting, for example, vertical front support member 34, and/or vertical rear support member 36 into vertical support interlock pocket 22 already occupied, in part, by vertical side member support 38, substantially locks all three of these component members 28, 30 and 26 together and to base member 12. Rear cargo support locking rail 32 also allows locking of cargo support member 44 into place.

Figure 17:
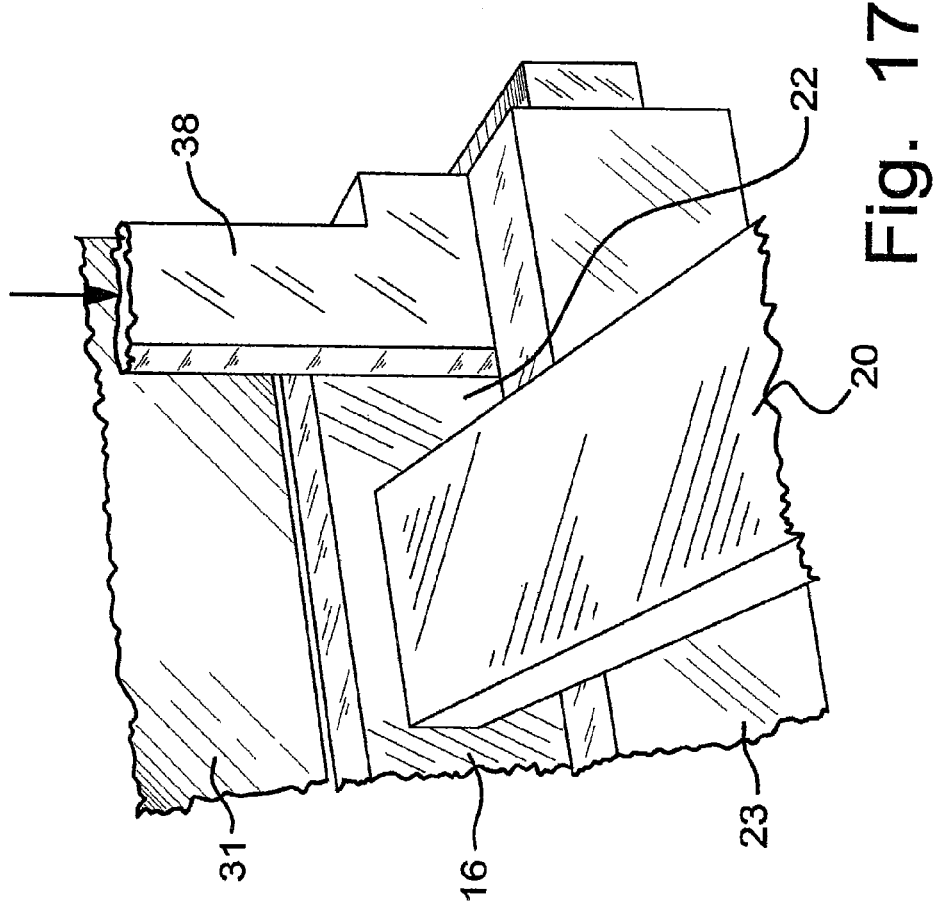
FIG. 17 is a detail of FIG. 1 showing an alternative means to that illustrated in FIG. 6 for interlocking a side vertical member and the base member.
Figure 18:
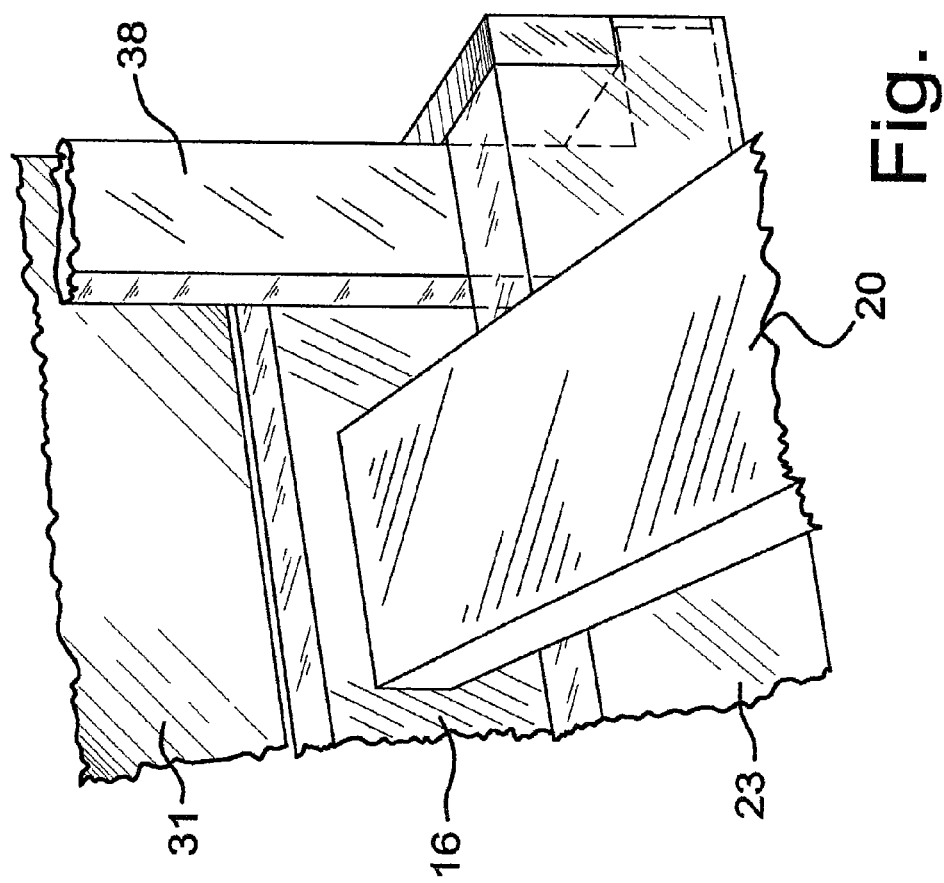
FIG. 18 shows the interlocking means of FIG. 17 in interlocking engagement with the base member.

An alternative way to interlock, for example, a vertical side member support into the base member is illustrated in FIGS. 17 and 18. Rather than the locking notch 40 formed in vertical side support member 38, a vertical support member 138 has been formed at a distal end thereof, namely, a locking foot 140, thus forming a substantially "L" shaped portion which can be engaged with a horizontal member of base member 12, for example, horizontal retaining member 139. Interlocking engagement of locking foot 140 with horizontal retaining member 139 is shown in FIG. 18. As with the previously described interlocking of locking notch 40 with side locking rail 18, this alternative interlocking structure, locking foot 140 and horizontal retaining member 139, provides a very strong container requiring a minimum of additional fasteners.

Figure 2:
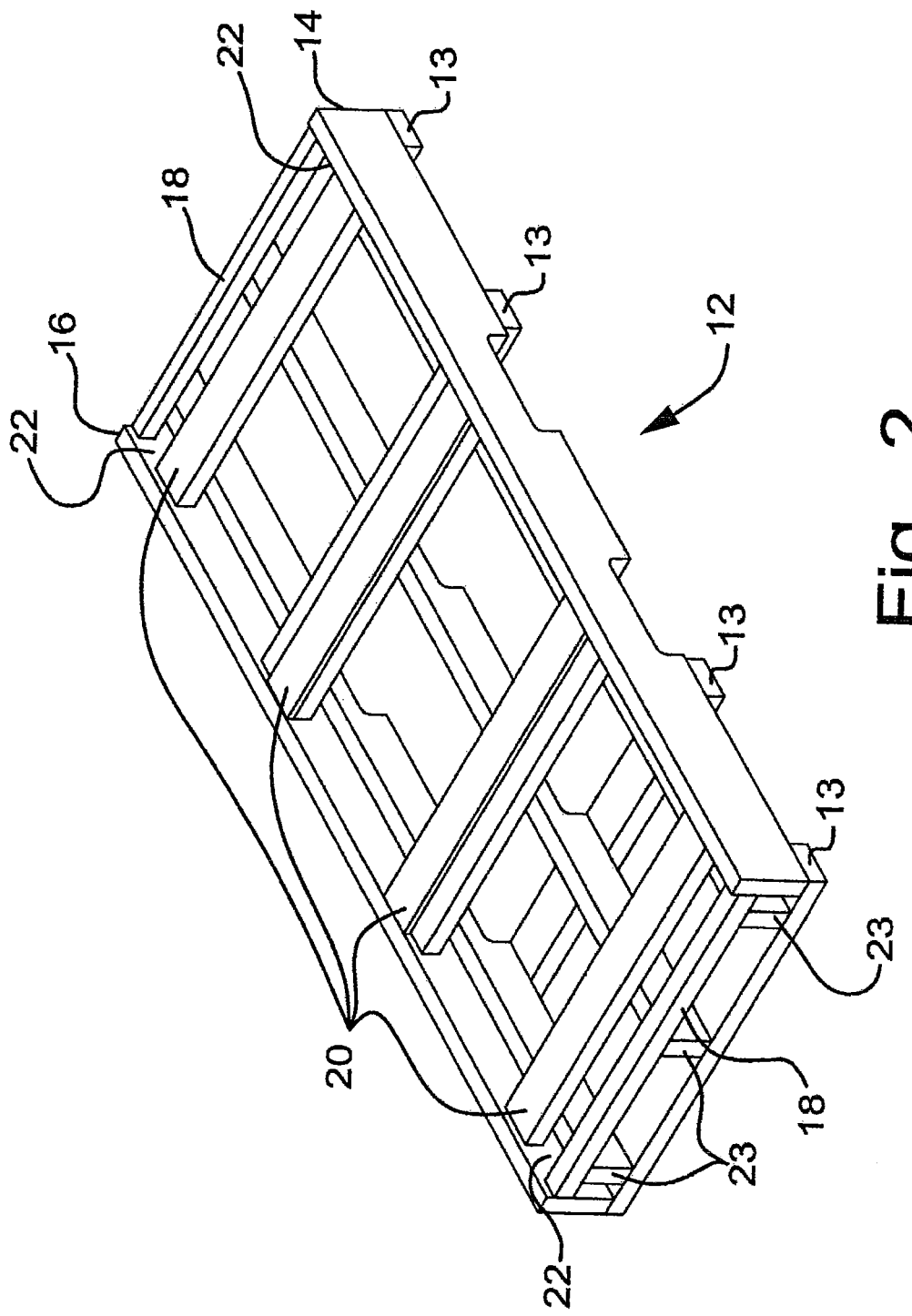
FIG. 2 is a perspective view of the base member according to the invention.

Referring now to FIG. 2, base member 12 can be any shape, but is preferably rectangular in configuration, and is preferably made up of front base rail 14, parallel rear base rail 16 and one or more parallel interior base rail(s) 23. Substantially perpendicular to the aforesaid base rails 14, 16, 23 and mechanically fastened thereto are, preferably, one or more base member support(s) 13, side locking rails 18 and one or more horizontal load support(s) 20. The length of side locking rails 18 and horizontal load support(s) 20, which are substantially the same, define the distance between front base rail 14 and rear base rail 16. Conversely, the distance between side locking rails 18 substantially defines the length of front base rail 14, rear base rail 16, and interior base rail(s) 23.

Preferably, in each of the four corners of the base member 12, a vertical member support interlock pocket 22 is formed by the intersection of front base rail 14 and a first interior base rail 23 or rear base rail 16 and a second interior base rail 23, and, perpendicular thereto, first and second side locking rails 18 and first and second horizontal load supports 20.

As will be further discussed, the vertical member support interlock pockets 22 are capable of receiving and holding one or more vertical member supports and to provide a positive interlock function for front, rear and side vertical members 28, 30, and 26 respectively, of the inventive container.

Figure 3:
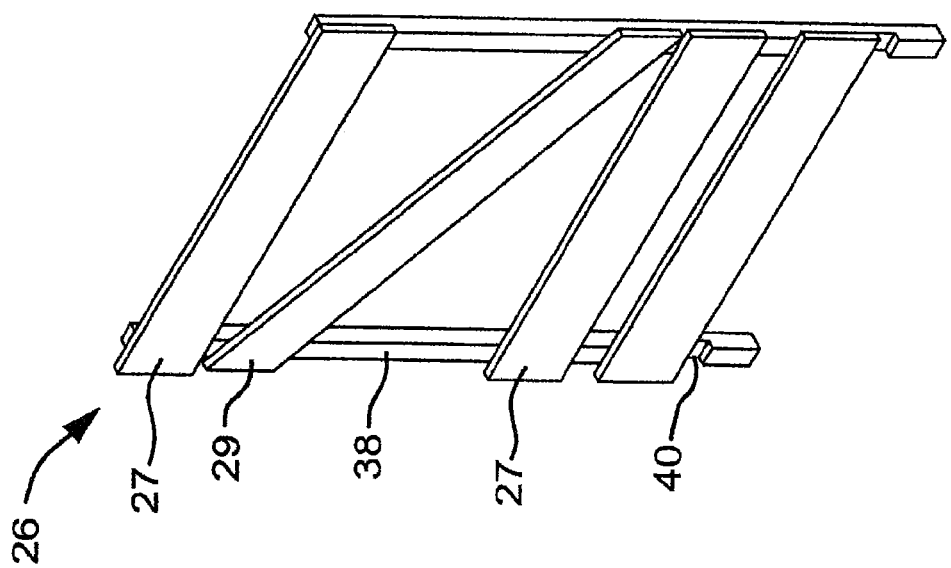
FIG. 3 is a perspective view of an end vertical member showing certain interlocking details according to the invention.

Referring to FIG. 3, the container includes at least one, but preferably two, vertical side members 26. The side member 26 is made up of one or more vertical side member supports 38, preferably including at a predetermined location thereon, a locking notch 40, which when the vertical side member support 38 is fully engaged in vertical member support interlock pocket 22, will lockingly engage with side locking rail 18. The vertical side member supports 38 are separated by a distance substantially equal to the length of locking side rail 18. One or more horizontal side member brace(s) 27 have a length substantially equal to that of the locking side rail 18. Optionally, one or more side member angle braces 29 extend at a predetermined angle between horizontal side member braces 27. All braces 27, 29 are mechanically fastened to vertical side member supports 38.

Figure 4:
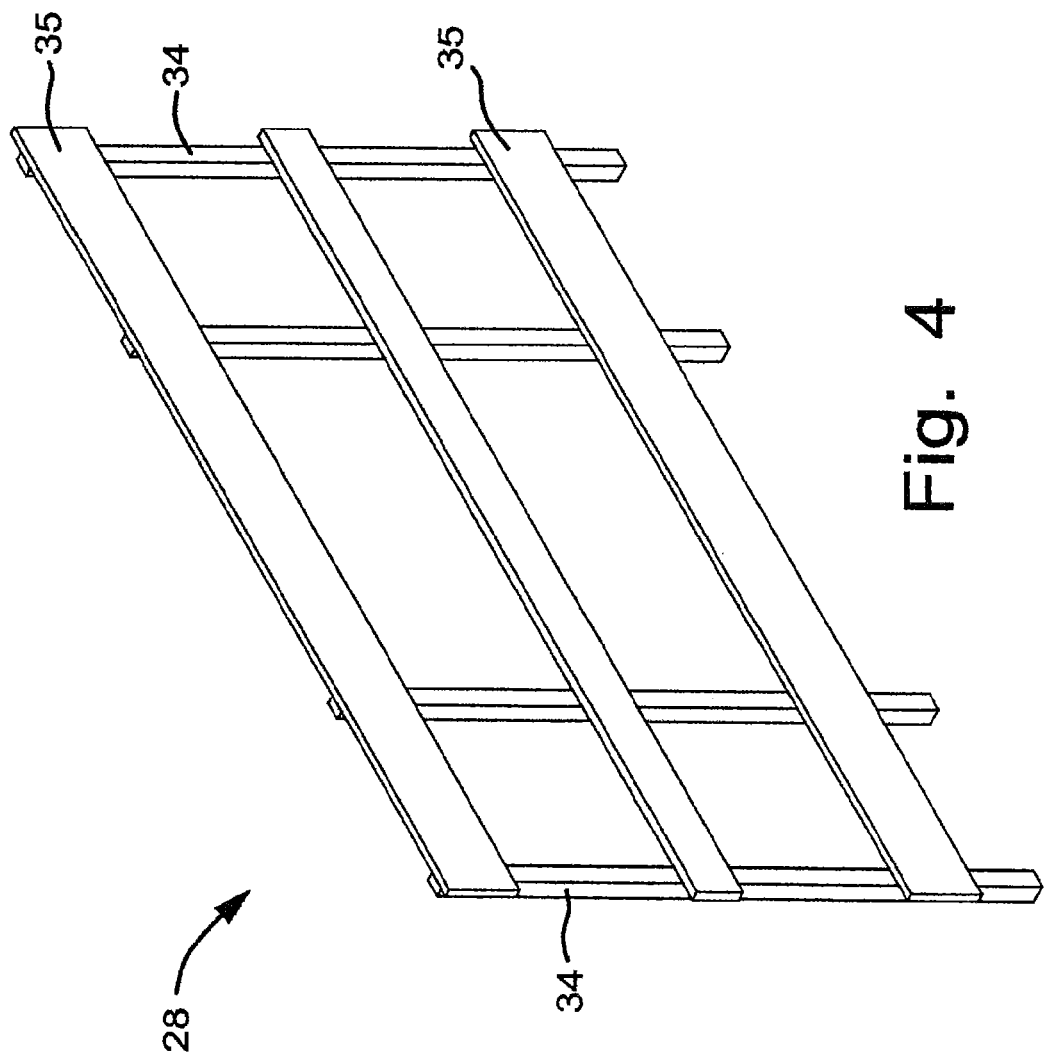
FIG. 4 is a perspective view of the front vertical member according to the invention.

Referring to FIG. 4, the illustrated container 10 includes at least one vertical front member 28, which is made up of one or more of vertical front member support(s) 34. Mechanically fastened to vertical front member support(s) 34 and substantially perpendicular thereto, are preferably, one or more horizontal front brace members 35.

Figure 5:
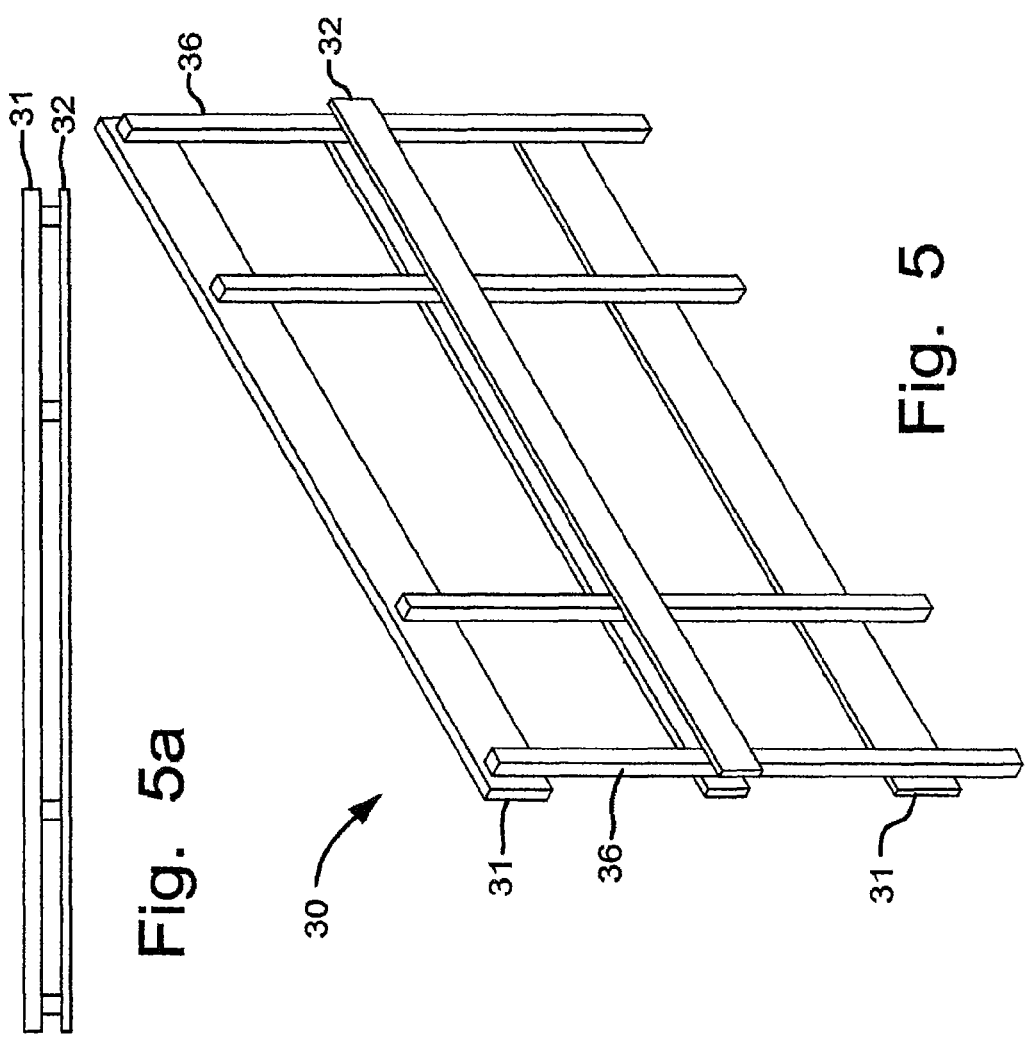
FIG. 5 is a perspective view of the rear vertical member according to the invention.
Figure 6:
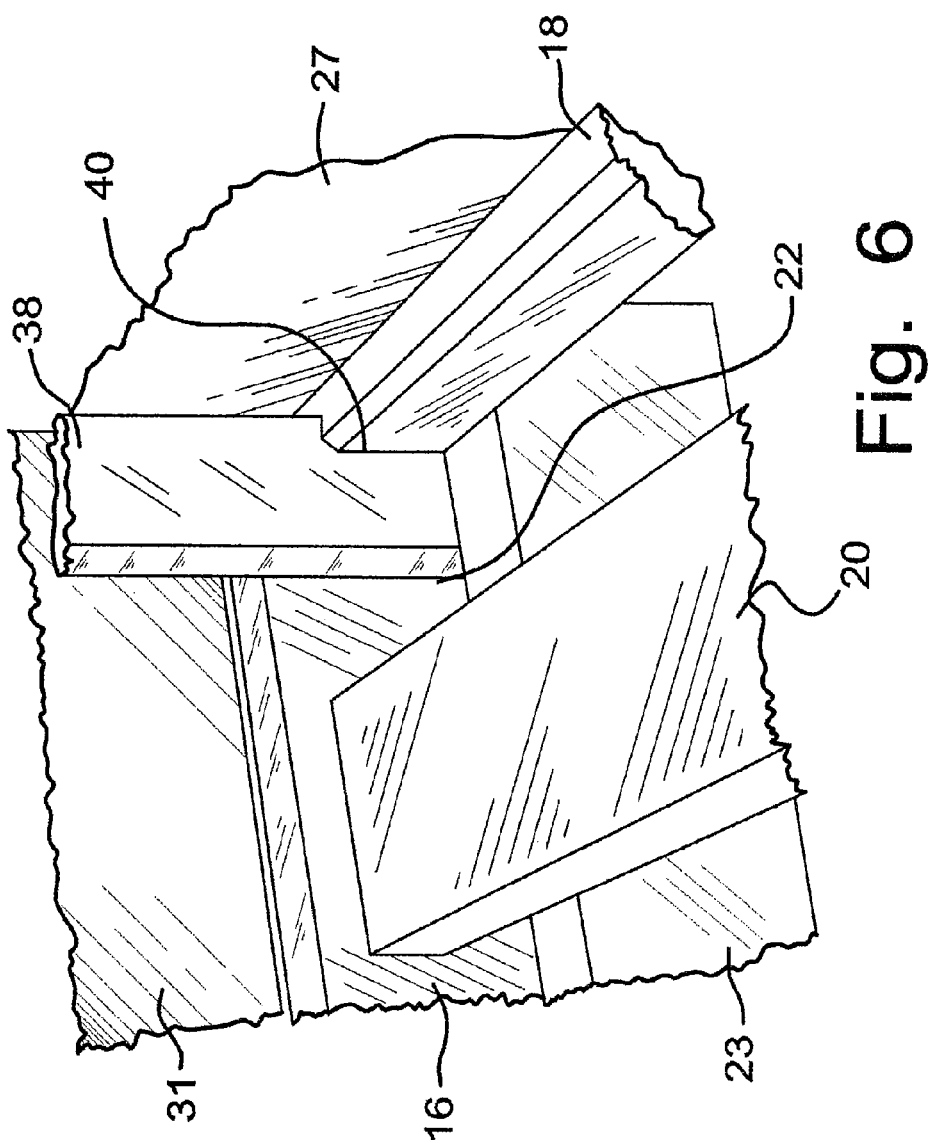
FIG. 6 is a detail of FIG. 1 showing the interlocking means between a side vertical member and the base member according to the invention.

Referring to FIG. 5, the container includes at least one vertical rear member 30, which is made up of one or more vertical rear member support(s) 36. Mechanically fastened to vertical rear member support(s) 36, and substantially perpendicular thereto, are preferably one or more horizontal rear brace members 31. Also, mechanically fastened to vertical rear member support(s) 36, but best seen in FIG. 5a, is substantially horizontal cargo support locking rail 32.

Figure 9:
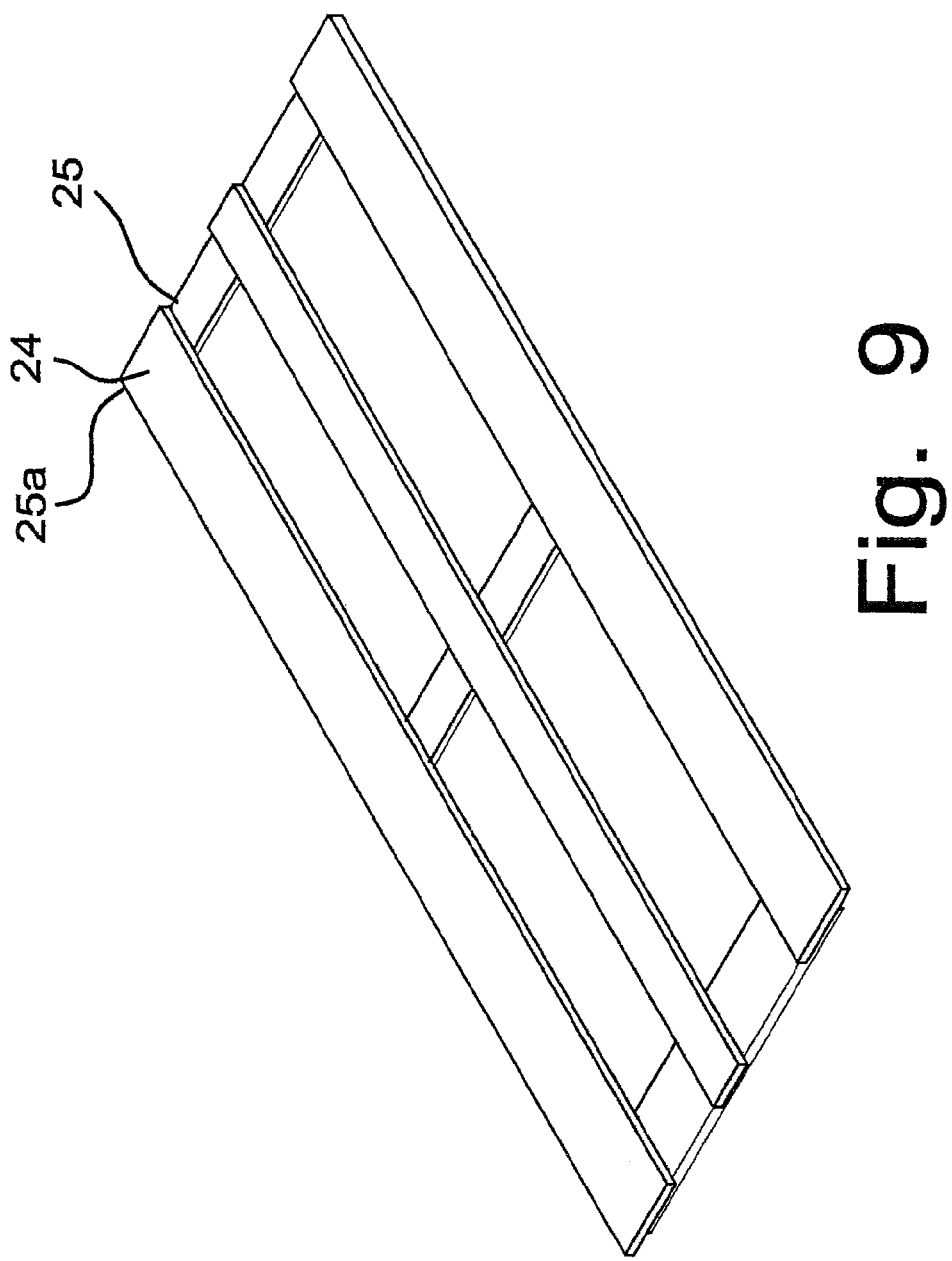
FIG. 9 is a perspective view of the top or lid member according to the invention.

FIG. 9 is a perspective view of top or lid member 24 which is made up of at least one top rail 25 and substantially perpendicular and mechanically fastened to the at least one top rail 25, at least one top brace 25a.

Figure 1:
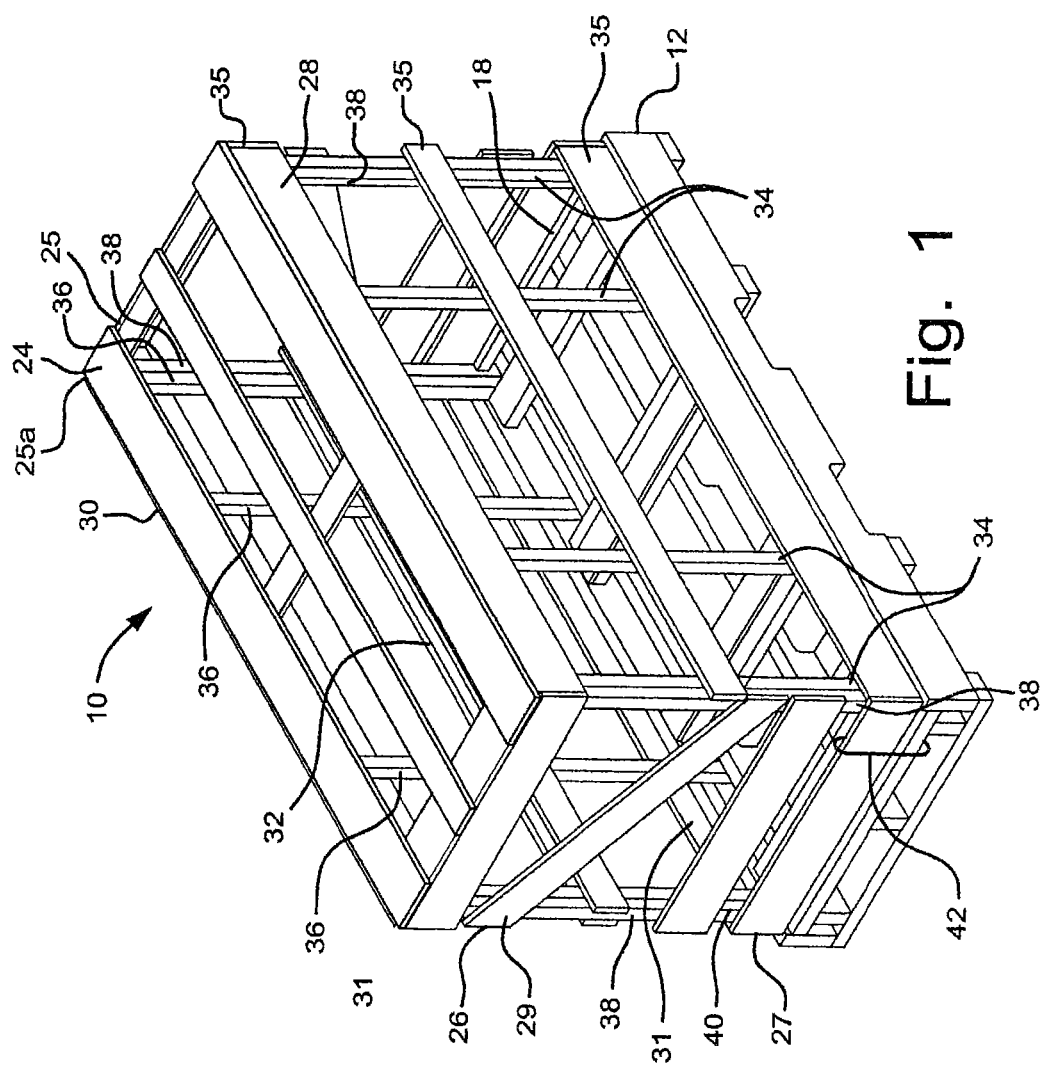
FIG. 1 is a perspective view of the fully assembled container according to an embodiment of the invention.
Figure 10:
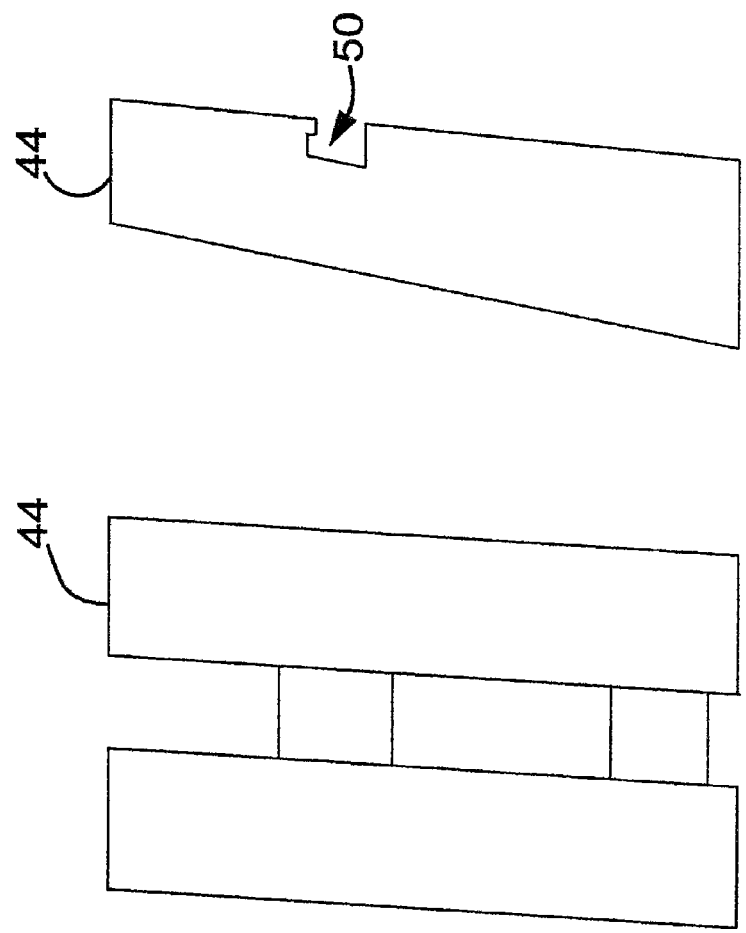
FIG. 10 is a front and side view of the cargo support member according to the invention.
Figure 10A:
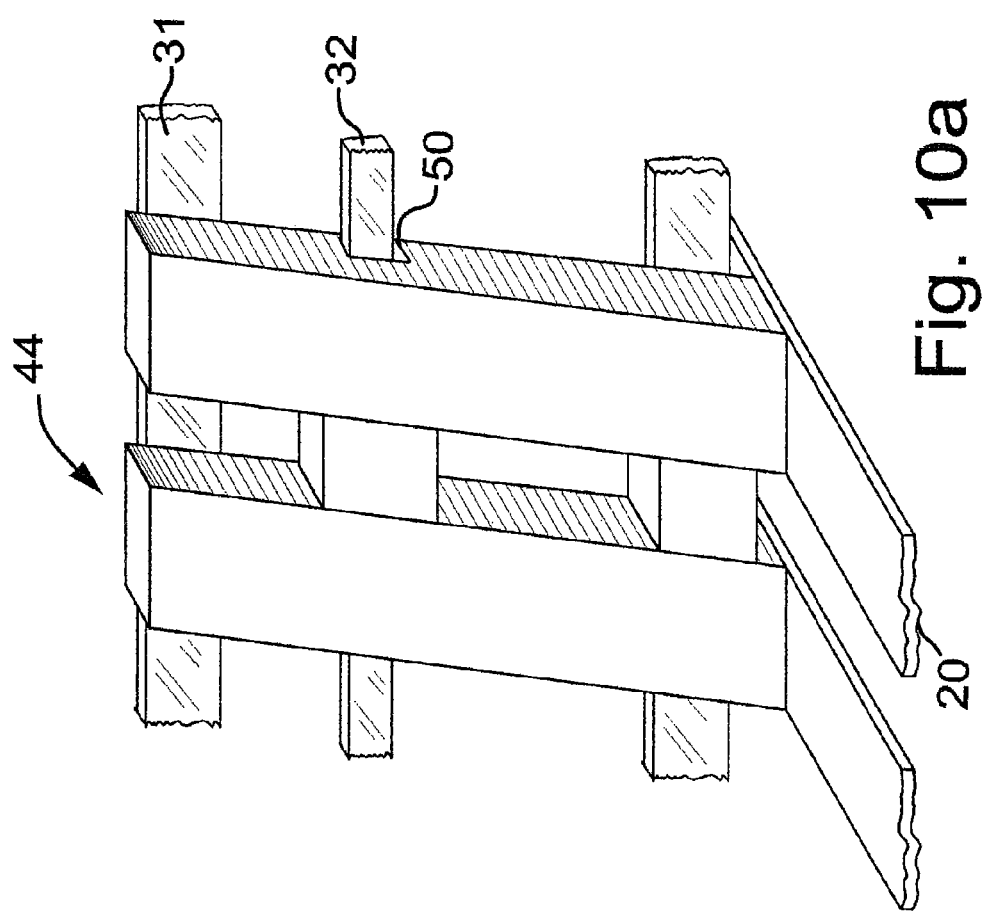
FIG. 10a is a perspective view of the cargo support member according to the invention according to the invention.
Figure 13:
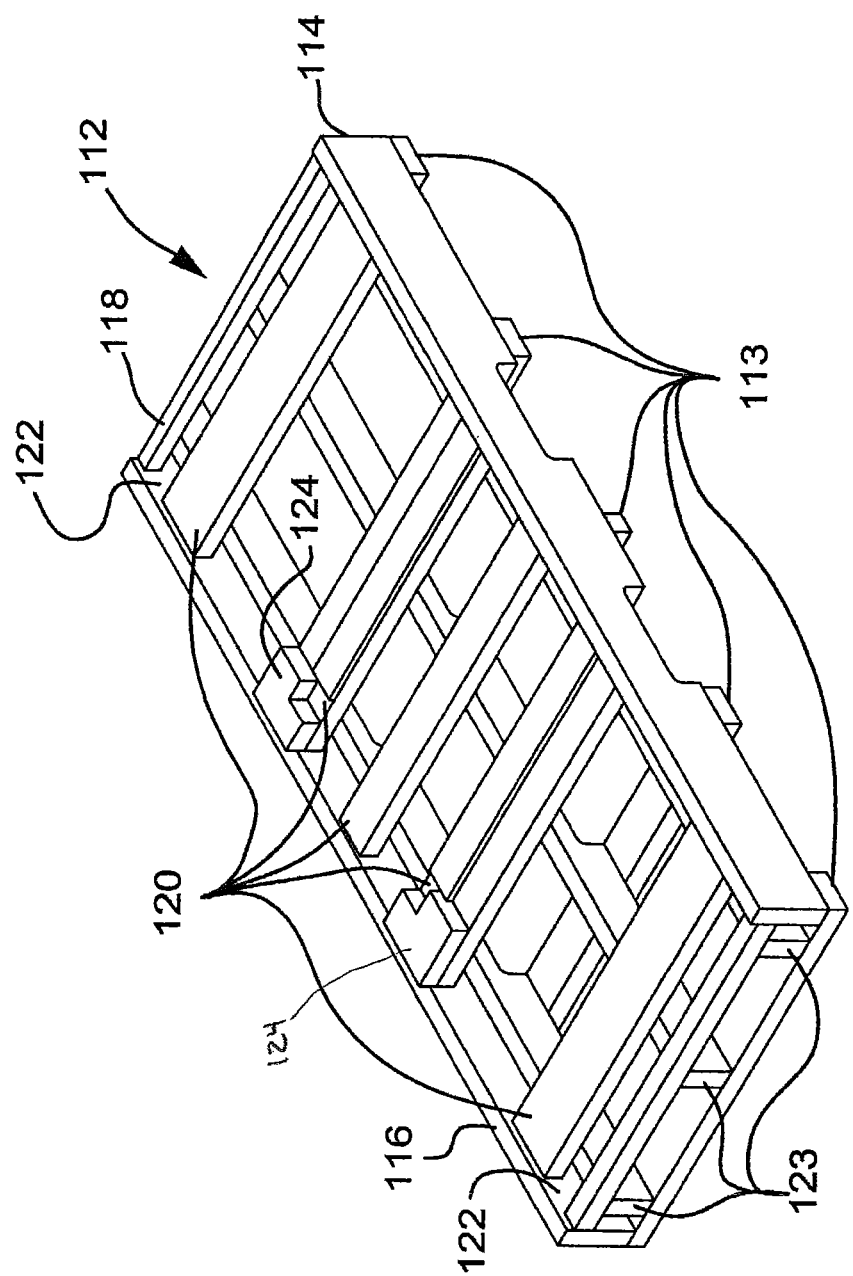
FIG. 13 is a perspective view of an alternative base member according to the invention.

Referring now to FIG. 1, an assembled container 10 is shown, utilizing the component members previously described herein, as well as an exemplary locking strap 42, shown in more detail in FIG. 11. Not shown in FIG. 1 is cargo support member 44, but cargo support member 44 is best seen in FIG. 10, and as placed in container 10, in FIG. 10a.

While the type of mechanical fasteners utilized to join various component parts of the present convention is not critical, exemplary mechanical fasteners include nails, screws and staples.

Cargo support member 44 may be formed from any suitable material, but is preferably a corrugated material, more preferably corrugated cardboard.

Locking strap 42 may also be made of any suitable material, but is preferably made of a polymeric material having a unidirectional locking feature, for example a plastic "zip-tie".

Horizontal load supports 20 may, optionally, be provided with a material having resilient and/or non-slip properties on the upper surface of same where it supports a peripheral edge of a glass sheet, thus providing some "give" and avoiding cargo shifting, accordingly reducing glass breakage.

While other methods of assembling the container 10 are possible, a preferred method of assembly involves at least the following steps:
  providing a rectangular base member 12 having in each corner thereof, a vertical member support interlock pocket 22 formed by the intersection of: front base rail 14 or rear base rail 16, parallel first and second interior base rails 23 and substantially perpendicular thereto, side locking rails 18 and horizontal load supports 20;
  inserting one or more vertical side member supports 38 of vertical side member 26 into both a front and a rear vertical member support interlock pocket 22;
  engaging locking notches 40 on front and rear vertical side member supports 38 with side locking rail 18;
  inserting vertical rear member supports 36 of vertical rear member 30 into two rear vertical member support interlock pockets 22, locking the vertical rear member 30 and the one or more vertical side members 26 into base member 12;

placing cargo support member 44 into the container 10, and engaging the locking portion 50 of cargo support member 44 with cargo support locking rail 32, a component of vertical rear member 30;

loading the cargo into container 10 so as to be supported by cargo support member 44 and one or more of horizontal load supports 20;

inserting vertical front member supports 34 of vertical front member 28 into two front vertical member support interlock pockets 22, locking the vertical front member 30 and the one or more vertical side members 26 into base member 12;

placing top 24 onto container 10, into closing contact with horizontal brace members 27, 31 and 35, so as to protectively enclose the cargo;

supplementally interlocking the various vertical members 26, 28, 30 of the container, and with base member 12 by use of a plurality of locking straps 42; and optionally wrapping metal or plastic banding at selected locations around container 10.

The capabilities of the container of the invention may be expanded by utilizing a multi-position cargo support member 144 in place of the cargo support member 44 previously described herein. Cargo support member 144, illustrated, for example, in FIG. 12*a-d,* is preferably made of wood. Components of cargo support member 144 preferably include: at least one vertical cargo support member 146 having at least one interlock notch 154 formed at a predetermined location in vertical support member 146; a first horizontal cargo support member 148 and a second horizontal cargo support member 150, each horizontal cargo support member 148, 150 having one or more interlock notches 156 formed at a predetermined location in each of the horizontal support members 148, 150. As can be seen in FIG. 12*a,* the interlock notches of the at least one vertical cargo support member and first and second horizontal cargo support members 148, 150 can be joined to form interlocking cargo support joint 152, forming a self-supporting, reusable cargo support member without the need for any additional mechanical fasteners. Vertical cargo support members 146 also supportingly interact with horizontal load supports 120 in base member 112, as will be further described hereinafter.

Base member 112 is substantially similar to base member 12, and includes, for example, front base rail 114 rear base rail 116, interior base rails 123, horizontal load supports 120, side locking rails 118, vertical support member interlock pockets 122 and base member supports 113. Additionally, however, mechanically fastened to a horizontal load support 120 is at least one substantially "L"-shaped horizontal cargo support member locating block 124.

Figure 14:
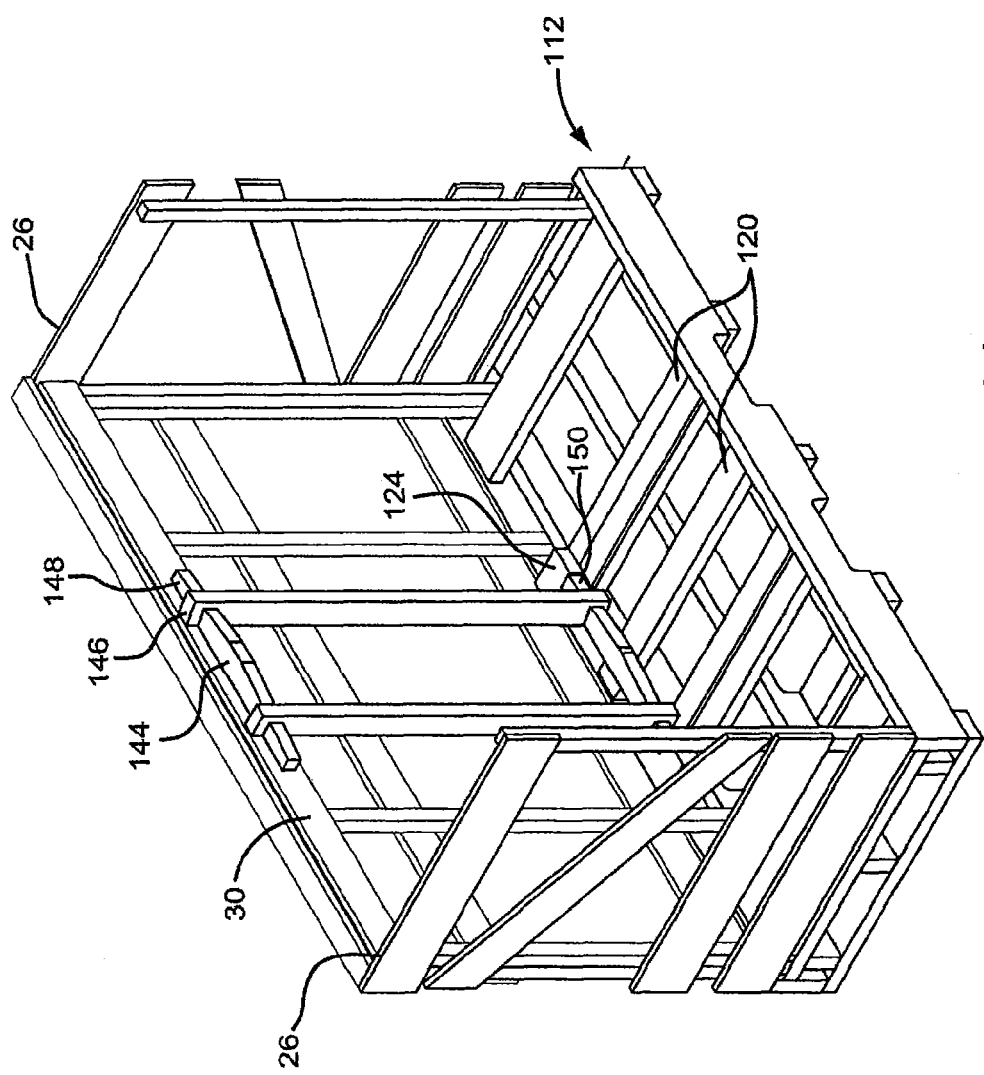
FIG. 14 is a perspective view of the container according to the invention utilizing the alternative base member and alternative cargo support member in one of its possible positions.

As shown in FIG. 14, multi-position cargo support member 144 is placed inside a partially assembled container according to the invention, in a first position, such that second horizontal cargo support member 150 is in locating contact within the "L"-shaped horizontal cargo support member locating block 124. Additionally, vertical cargo support members 146 supportingly contact horizontal load support members 120. In this configuration, cargo support member 144 holds the cargo in a relatively upright position, on the order of 5-10° from vertical.

Figure 15:
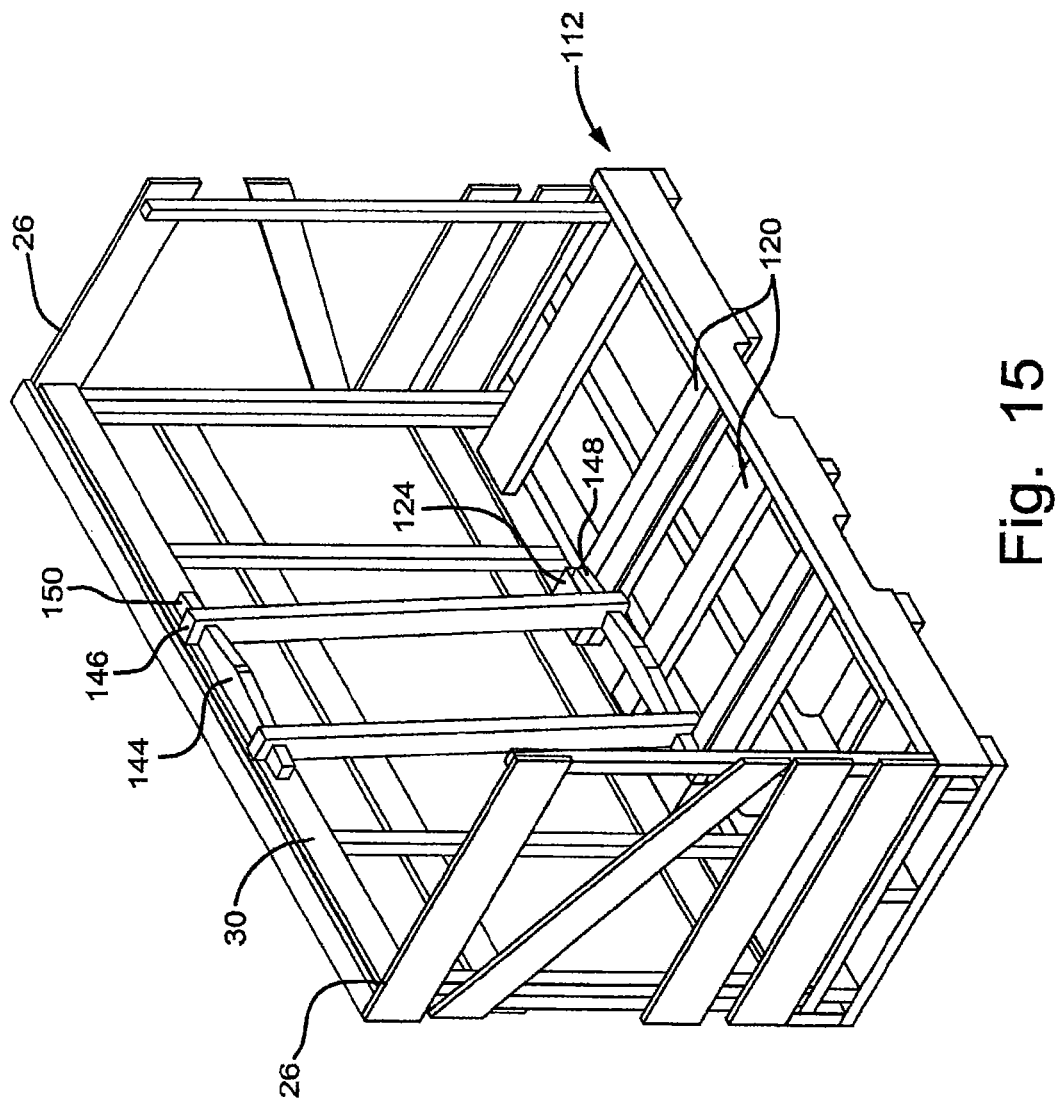
FIG. 15 is a perspective view of the container according to the invention utilizing the alternative base member and alternative cargo support member in a second of its possible positions.

As shown in FIG. 15, multi-position cargo support member 144 is again placed inside a partially assembled container according to the invention, in a second position, such that first horizontal cargo support member 148 is in locating contact with only one leg of the "L" of horizontal cargo support member locating block 124. Vertical cargo support members 146 again supportingly contact horizontal load support members 120. In this configuration, cargo support member 144 holds the cargo in a somewhat more inclined position, on the order of 10-15° from vertical.

Figure 16:
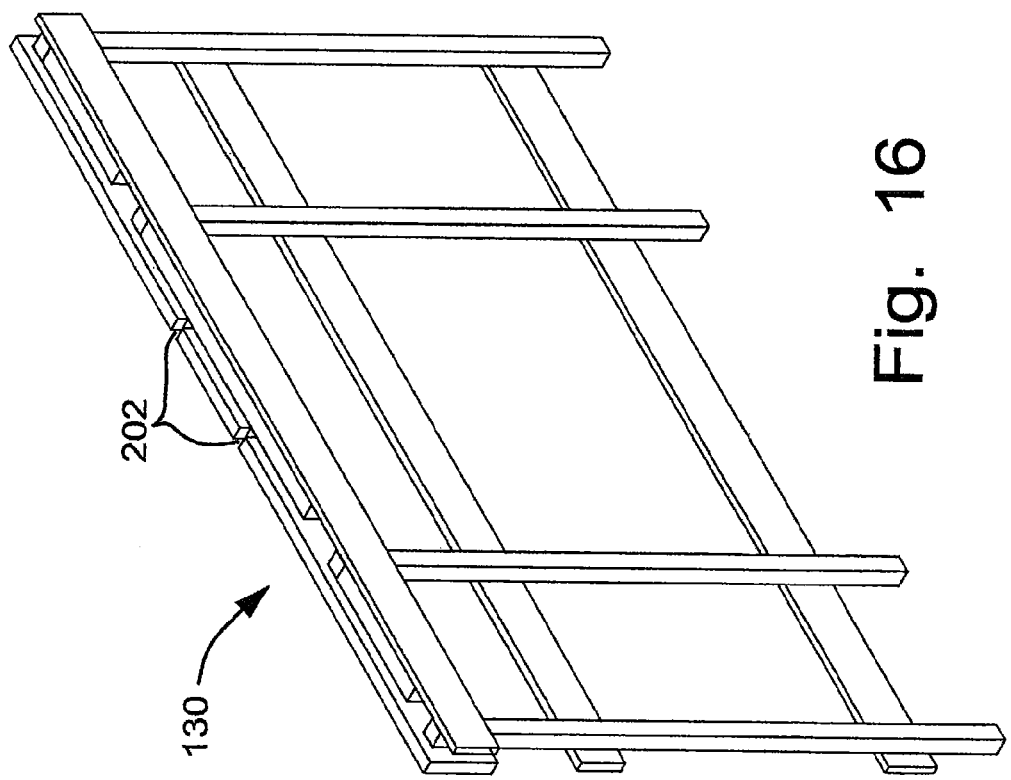
FIG. 16 shows a perspective view of a rear vertical member according to the invention including optional banding material locating notches.

In connection with the utilization of cargo support member 144, it may be desirable to supplementally secure the cargo in the container by means of metal or plastic strapping or banding material. To ensure optimal location of such banding material in relation to cargo support member 144, one or more band locating notches 202 may be formed in rear vertical member 130, as shown in FIG. 16.

Figure 19:
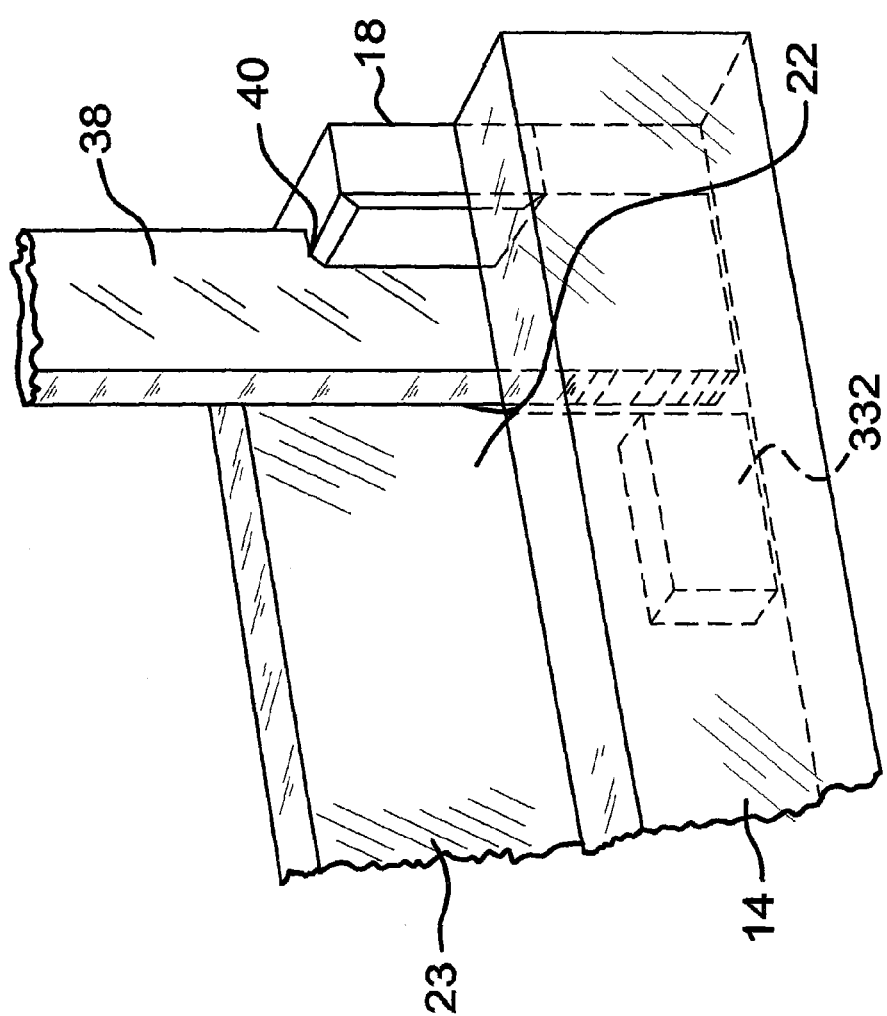
FIG. 19 shows a feature for preventing the undesirable displacement of a side vertical member during loading in one configuration of the container according to the invention.
Figure 20:
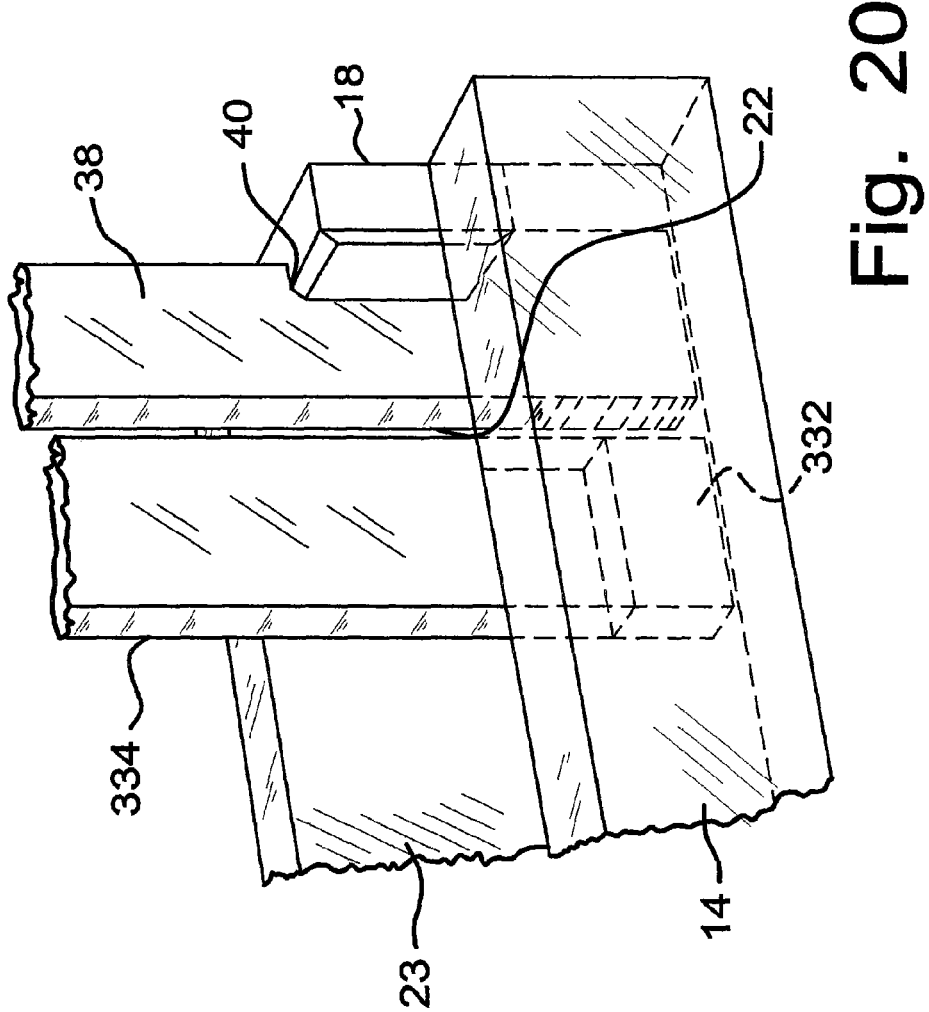
FIG. 20 shows a view similar to FIG. 19 with the front vertical member in place after, for example, loading of the container has been completed, in one configuration of the container according to the invention.

An optional feature referred to herein as a "stop block", is intended to prevent undesired lateral displacement of vertical side member support 38 in the interlock pocket 22 proximate the front side of the container, prior to insertion of vertical front member support 334 into interlock pocket 22 due to, for example, ongoing operations of loading cargo into the container. FIG. 19 shows the disposition of stop block 332 in interlock pocket 22, proximate the base of vertical side member support 38, which has been inserted into interlock pocket 22. It should be appreciated that in order to insert vertical side member support into the interlock pocket 22, while at the same time avoiding stop block 332 and engaging locking notch 40 with side locating rail 18, it may be necessary to initially insert vertical side support member into interlock pocket at an angle less than 90°, and then to raise the vertical side member support to the vertical in a second insertion step. Once inserted by whatever method, it can be readily appreciated that lateral displacement of the vertical side support member 38 in the interlock pocket 22 is substantially prevented. The stop block may be made from any suitable material, but is preferably made from wood, and is securely attached to base member 12, preferably to base member support 13 or front base rail 14 by any suitable fasteners. FIG. 20 shows vertical front support member 334, which has been modified, i.e., made shorter compared to standard front vertical support member 34, in order that vertical front support member 334 is adapted to rest firmly on an upper surface of stop block 332, while also still being positively retained in interlock pocket 22. Thus, as previously described herein, various members interact with each other to create a robustly interlocked structure and, thus, a strong container in this optional configuration as well as in the previously described configurations.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A reusable container comprising:
    one or more base member supports;
    a base member comprising a front base rail, a rear base rail and one or more interior base rails, the front and rear base rails being substantially parallel to one another and separated by a distance corresponding to the length of at least one horizontal load support, and two side locking rails substantially parallel to one another, and separated by a distance corresponding to the length of the front and rear base rails, and the one or more interior base rails, wherein the front and rear base rails, the at least one horizontal load support, the one or more base member support and side locking rails are mechanically fastened to one another to form a substantially rectangular shape;

at least one vertical member support interlock pocket formed by the intersection of the front base rail or the rear base rail, one of the one or more interior base rails, a first one of the side locking rails and one of the at least one horizontal load supports;

at least one vertical side member comprising at least one side member brace and at least one vertical side member support with locking notch, mechanically fastened to one another, inserted into a front and a rear vertical member support interlock pocket, the locking notch lockingly engaging the first one of the side locking rails;

a vertical front member comprising at least one horizontal front brace member and at least one vertical front member support mechanically fastened to one another and inserted into the vertical support interlock pockets formed by the front base rail, one of the one or more interior base rails, the first one of the side locking rails and one of the at least one horizontal load supports;

a vertical rear member comprising at least one horizontal rear brace member and at least one vertical rear member support mechanically fastened to one another, inserted into the vertical support interlock pockets formed by the rear base rail, one of the one or more interior base rails, the first one of the side locking rails, and one of the at least one horizontal load support;

a top member comprising at least one horizontal top member and at least one top brace oriented perpendicular to the at least one horizontal top member and mechanically fastened thereto, the top member closingly contacting one or more of the at least one horizontal front brace member, the at least one horizontal rear brace member, and the at least one horizontal side member brace; and a cargo support member contacting and extending substantially vertically from the one or more horizontal load supports for a predetermined vertical distance relative to the vertical rear member.

2. The reusable container defined in claim 1, wherein a bottom portion the at least one vertical member support interlock pocket is enclosed by the at least one base member support.

3. The reusable container defined in claim 1, wherein the cargo support member comprises a corrugated material.

4. The reusable container defined in claim 3, wherein the rear vertical support member further comprises a cargo support locking rail.

5. The reusable container defined in claim 4, wherein the cargo support member interlockingly engages the cargo support locking rail.

6. The reusable container defined in claim 3, wherein apart from the cargo support member the container comprises wood.

7. The reusable container defined in claim 1, wherein the at least one vertical side member further comprises at least one side member angle brace.

8. The reusable container defined in claim 1, wherein at least a portion of a top surface of the at least one horizontal load support is covered with a resilient material.

9. The reusable container defined in claim 1, wherein one or more of the base member, the vertical front member, the vertical rear member and at least one vertical side member are attached to one another by locking straps.

10. The reusable container defined in claim 1, wherein the cargo support member comprises wood.

11. The reusable container defined in claim 10, wherein the cargo support member comprises at least one vertical interlock notch, and first and second horizontal cargo support members, each having at least one interlock notch.

12. The reusable container defined in claim 11, wherein the at least one interlock notch of the at least one vertical cargo support member is brought into interlocking contact with the at least one interlock notch of the first and second horizontal cargo support members to form a self-supporting cargo support member.

13. The reusable container defined in claim 1, wherein the base member comprises at least one substantially L-shaped horizontal cargo support member locating block mechanically fastened to a horizontal load support.

14. The reusable container defined in claim 13, wherein the at least one vertical cargo support member is disposed in locating contact within the L-shaped horizontal cargo support member locating block.

15. The reusable container defined in claim 14, wherein the at least one vertical cargo support member is in supporting contact with adjacent horizontal load support members.

16. The reusable container defined in claim 13, wherein the first horizontal cargo support member is in locating contact with only one leg of the "L" of the horizontal cargo support member locating block.

17. The reusable container defined in claim 16, wherein the at least one vertical cargo support member is in supporting contact with adjacent horizontal load support members.

18. The reusable container defined in claim 1, wherein one or more cargo band locating notches are formed in a horizontal brace of the rear vertical member.

19. The reusable container defined in claim 1, wherein a stop block is fastened in a predetermined location in at least one front interlock pocket so as to be proximate to a base of the vertical side member support disposed in the interlock pocket, the stop block preventing lateral displacement of the vertical side member support.

20. The reusable container defined in claim 19, wherein the stop block provides support for at least one vertical front support member, when the vertical front support member is inserted into the interlock support pocket.

21. A reusable container comprising:

one or more base member supports;

a base member comprising a front base rail, a rear base rail and one or more interior base rails, the front and rear base rails being substantially parallel to one another and separated by a distance corresponding to a length of at least on horizontal load support, and by a horizontal retaining member substantially parallel to the at least one horizontal load support and separated by a distance corresponding to a length of each of the front and rear base rails and the one one or more interior base rails, wherein the one or more base member supports and the horizontal retaining member are mechanically fastened to one another to form a substantially rectangular shape;

at least one vertical member support interlock pocket formed by the intersection of the front base rail or the rear base rail, one of the one or more of interior base rails, a side locking rail and one of the at least one horizontal load supports;

at least one vertical side member comprising at least one side member brace and at least one vertical side member support with interlocking foot, mechanically fastened to one another inserted into a front and rear vertical member support interlock pocket, the interlocking foot lockingly engaging the horizontal retaining member and one of the at least one vertical front member supports and one of the at least one vertical side member supports;

a vertical front member comprising at least one horizontal front brace member and at least one vertical front member support mechanically fastened to one another inserted into one of the at least one vertical support interlock pockets formed by the front base rail, one of the one or more interior base rails, the side locking rail and one of the at least one horizontal load supports;

a vertical rear member comprising at least one horizontal rear brace member and at least one vertical rear member support mechanically fastened to one another inserted into one of the at least one vertical support interlock pockets formed by the rear base rail, one of the one or more interior base rails, the side locking rail, and one of the at least one horizontal load supports;

a top member comprising at least one horizontal top member and at least one top brace oriented perpendicular to the at least one horizontal top member and mechanically fastened thereto, the top member closingly contacting one or more of he at least one horizontal front brace member, the at least one horizontal rear brace member, and the at least one horizontal side member brace; and a cargo support member contacting and extending substantially vertically from the one or more horizontal load supports for a predetermined vertical distance relative to the vertical rear member.

\* \* \* \* \*